Feb. 12, 1935.  H. H. GLASIER  1,990,900
COMPENSATING DRAWBAR
Filed Jan. 7, 1933
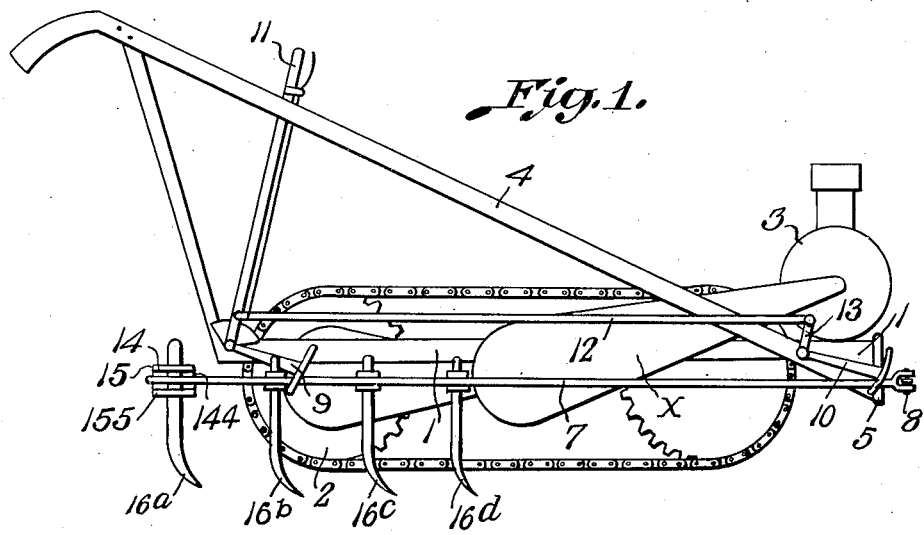
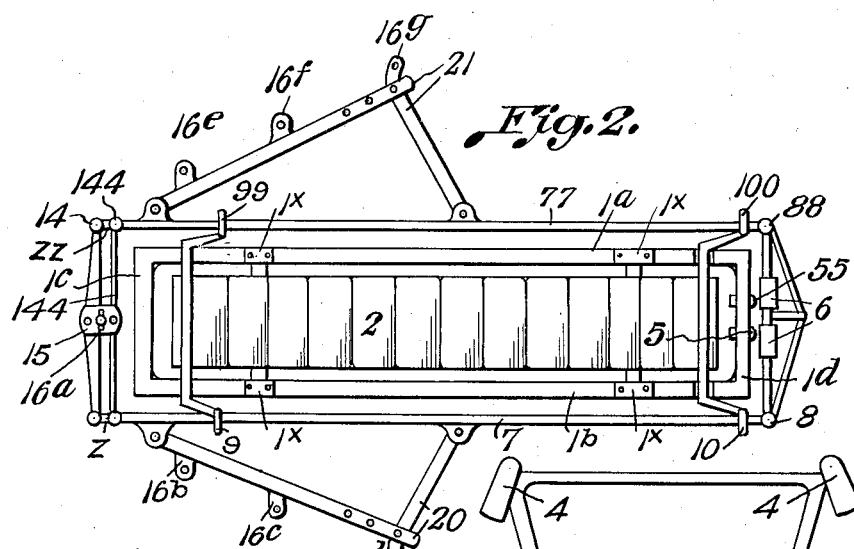
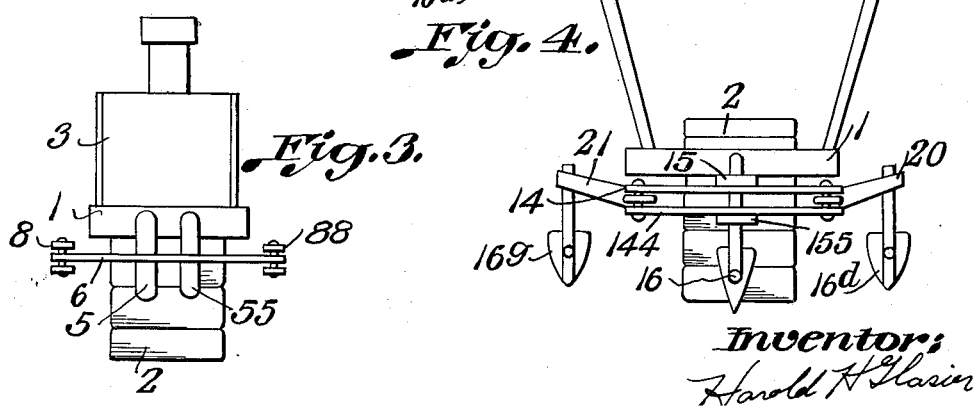
Inventor:
Harold H. Glasier Patented Feb. 12, 1935

1,990,900

UNITED STATES PATENT OFFICE 1,990,900

COMPENSATING DRAWBAR

Harold H. Glasier, Los Angeles, Calif.

Application January 7, 1933, Serial No. 650,619

7 Claims. (Cl. 97—48)

The present invention relates to a drawbar for mounting or hitching ground working tools to tractors and is especially adapted for use on single tread tractors of the type known as garden or walking tractors, altho not limited to this use. It is an object of this invention to provide a means whereby the tools may be hitched or mounted at the side of a garden tractor, instead of either fore or aft as is the present practice, because in either position a disadvantage is encountered. Aft mounted tools must be separately steered which results in inaccurate steering and consequent damage to plants. Fore mounted tools are hard to turn at row ends and in fence corners. Side mounted tools, on the other hand, steer accurately as they occupy the same area and turn simultaneously with the tractor and side mounted tools are easily turned at row ends as they do not add any overall length to a tractor. However, altho side mounted tools overcome the disadvantages of both fore and aft mounted tools, they contain within themselves a disadvantage which must be overcome before their application is practical. This disadvantage is a tendency to swing away from an excessive load pressure instead of bearing into it. This action reflects the tool and all that is rigidly connected to it and straight travel of the implement becomes impossible. To overcome this disadvantage is the principal object of this invention and to this end I have balanced the tool load and provided compensating means to care for any variation in load so that all tendency to swing away from excessive loads is relieved.

These objects, together with other objects and corresponding accomplishments are obtained by means of the embodiment of my invention, illustrated in the accompanying drawing, in which:

Fig. 1 is a side elevation; Fig. 2 a sectional plan; Fig. 3 a front elevation and Fig. 4 a rear elevation.

Referring to the drawing, 1 is a tractor frame which encompasses a traction wheel or tracklayer device 2 and suports a power plant 3 and drive mechanism X. The frame may consist of two parallel members 1A—1B, Fig. 2, spanned by front and rear members 1D and 1C, Fig. 2, all of which are rigidly formed and fitted. On the side members 1A and 1B are mounted the bearing blocks 1x in which the axles of the traction wheel or track-layer are journalled. The side members also carry the guide handles 4 which extend upward and backward. On the front member 1D are two upright or vertically extending, narrowly formed thrust blocks 5—55 Figs. 1—2—3. These are mounted at adjustable distances outward from either side of the center of the front member 1D. Bearing against these thrust blocks is the compensating lever 6 which is carried transversally across the front of the blocks and is of braced structure for strength and has rollers in contact with the blocks to facilitate ease in sliding up and down over the blocks while thrust is being transmitted. The compensating lever 6 is coupled at its extremities to the pair of spaced drawbars 7 and 77. The coupling 8 and 88 between the drawbars and compensating lever is universally flexible. The drawbars 7 and 77 are supported by the control arms 9 and 99 on either side of the tractor at the rear and 10 and 100 on either side at the front. Arms 9 and 99 support the drawbars by means of an elongated gripper which permits the drawbars a limited latitude of vertical movement so that the ground working tools which are attached to the drawbars will have sufficient freedom to draw well; the rear arms and the front arms are the depth gauge on the tools. The front arms 10 and 100 support the drawbars with a flexible rigidity so that the front arm may force the drawbar and consequently the compensating beam up or down over the thrust blocks with dependable accuracy. Both sets of control arms are keyed to shafts which span the tractor frame 1 and are journalled therein. A ratchet lever 11 is keyed to the rear shaft and rod 12 connects lever 11 with a short but simularly mounted lever 13 on the front shaft. Thus oscillation of lever 11 will cause like oscillation of lever 13 and consequent elevation or depression of front and rear sets of arms with of course the entire drawbar and compensating lever assembly. The drawbars are spanned at the rear by the double tie rods 14 and 144. These are flexibly coupled at either end to the drawbars at z and zz. In the middle of the double tie rods 14 and 144 is the link 15, formed in duplicate, top and bottom on the tie rods, being coupled by flexible pins. Reciprocating motion of drawbars and resultant oscillation of tie rods will not alter the forwardly pointed position of link 15. Tool holder 16a is mounted on link 15 and carries the only tool mounted behind the tractor. Tool holders 16 b—c—d—e—f—g are mounted on the outrigging 20 and 21 which is adjustably fitted one on each drawbar, so as to be swung in or out according to the width of the tilth desired. Any form of cultivating tool may be carried in the tool holders. Any form of tool hitch or holder may be used, provided the tool load is kept equally divided between the two draw bars.

In the operation of the device, as the tractor advances, ratchet lever 11 is swung forward which lowers the tools to any desired depth in the ground. Then as variations in the tool load occur, one drawbar will become overloaded in respect to the other drawbar. The overloaded drawbar will of course pull on the compensating lever with more force than the underloaded bar and as a consequence, the overloaded bar will tilt the compensating lever off balance, or off its even seat on the two thrust blocks. This action will result in all the thrust of the tractor flowing into the compensating lever and thence to the drawbars, thru the block nearest the overloaded bar. This block then becomes a fulcrum and as the distance between this fulcrum and that end of the compensating lever to which the underloaded drawbar is coupled is a greater distance than the distance between the fulcrum and the end of the compensating lever to which the overloaded bar is coupled, the underloaded bar gains a leverage over the overloaded bar and compensation for the variation in load is thus made. When the load again becomes normal on both bars, the bar having the greatest leverage will then draw the compensating lever back until it seats evenly on both thrust blocks and receives equal thrust from both.

What I claim is:

1. A tractor having a frame adapted to support a power plant and including guide means, a traction means adapted to carry said frame and be propelled by said power plant, a pair of adjustably spaced thrust blocks mounted side by side on the front face of said tractor frame, a compensating lever normally carried transversally across the front face of said thrust blocks, drawbars connected to the extremities of said compensating lever and extending rearward therefrom in longitudinal alignment with aforesaid tractor frame, a pair of tie rods flexibly connected to said drawbars rearwardly so as to maintain said drawbars in spaced relationship, arms swiveled to aforesaid tractor frame said arms for the purpose of supporting said drawbars, control means for the purpose of oscillating said arms and ground working tools adjustably mounted on said drawbars.

2. A tractor having a frame adapted to support a power plant and including guide means, a traction means adapted to carry said frame and be propelled by said power plant, ground working tools equally divided upon two spaced drawbars said drawbars extending longitudinally parallel to said tractor frame and receiving adjustable support therefrom, a compensating lever carried transversally across the forward face of said tractor frame said drawbars being flexibly coupled to said compensating lever so as to pull against same at points toward its extremities, and a long narrow forwardly pointed pair of thrust blocks adjustably spaced outward in either direction from the center of said forward face of said tractor frame.

3. The combination with a single tread tractor of the tracklaying type including guide handles, a pair of longitudinally extending tool carrying drawbars mounted astride said tractor in spaced relationship thereto said drawbars being provided with limited vertical freedom, a compensating lever flexibly coupled transversally across the forward extremities of said pair of drawbars, a pair of tie rods flexibly coupled transversally across the rearward extremities of said pair of drawbars said pair of tie rods being formed in duplicate with a segment placed above and a segment placed below said drawbars there existing flexible juncture between all members, a tool carrying cross link pivotally coupled across the middle of said pair of tie rods said cross link being forwardly pointed so that reciprocation of aforesaid pair of drawbars each to move in opposite direction to the other will result in oscillation of said pair of tie rods but non-distortion of said cross link, a pair of cross shafts spanning aforesaid frame one shaft toward the front thereof and one shaft toward the rear of said frame, a ratchet lever fixed to said rear shaft, a stub lever fixed to said forward shaft, a coupling rod swivelled to said ratchet lever and said stub shaft so that operation of said ratchet lever will result in operation of both said rearward and said forward shafts, arms keyed to the extremities of said shafts for the purpose of supporting said pair of drawbars said arms which support the forward section of said pair of drawbars being fitted to drawbars with flexible rigidity said arms which support the rearward section of said drawbars being fitted to said drawbars with a limited latitude of vertical freedom and sufficient horizontal freedom to prevent binding, and a pair of elongated thrust blocks vertically mounted at a forwardly position on aforesaid tractor frame said thrust blocks normally bearing upon the inner face of aforesaid compensating lever thereby delivering the thrust of the tractor evenly against said compensating lever.

4. A tractor having a frame adapted to support a power plant and including guide handles, a traction means adapted to carry said tractor frame and be propelled by said power plant, a pair of drawbars mounted astride said traction means in spaced relationship thereto, a compensating lever flexibly coupled across the forward extremities of said drawbars said compensating lever having rollers mounted on its inner face, a pair of thrust blocks vertically mounted in an adjustable manner on the forward face of aforesaid tractor frame so as to thrust against said rollers on said compensating lever, a pair of transversally spanning tie rods flexibly coupled across the rearward extremity of said pair of drawbars, a cross link carrying a tool holder with tool adjustably mounted therein said link being pivotally pinned to said tie rods in a forwardly pointed position in the middle of the length of said tie rods, controllable arms swiveled to aforesaid tractor frame said arms supporting said drawbars in a flexible manner, an adjustable outrigging mounted upon said drawbars said outrigging to carry adjustable tool holders and ground working tools disposed in said tool holders.

5. A tractor having the tool load equally divided between two drawbars, a pair of laterally spaced thrust blocks, a compensating lever balanced across said thrust blocks, support means for retaining said compensating lever in position and means provided for coupling said drawbars to said compensating lever.

6. A tractor having the tool load equally proportioned between two drawbar assemblies, a pair of thrust blocks centrally mounted upon said tractor, a compensating lever normally balanced across the face of said thrust blocks so as to receive the thrust of said tractor thru the medium of said thrust blocks, and means provided for coupling said drawbars to said compensating lever so as to enable the pull upon said drawbars to normally result in keeping said compensating lever evenly seated across said thrust blocks.

7. A tractor in which the tool load is carried in equal proportions by a pair of drawbars said drawbars being slidably mounted at the sides of said tractor and held in spaced parallel relationship therewith, a pair of thrust blocks mounted at equal distances in both directions outwardly from the center of said tractor, a compensating lever placed transversally across the forward face of said thrust blocks, and coupling means provided whereby said pair of drawbars are coupled to said compensating lever at equal distances outwardly from the center thereof.

HAROLD H. GLASIER.